Figure 1:
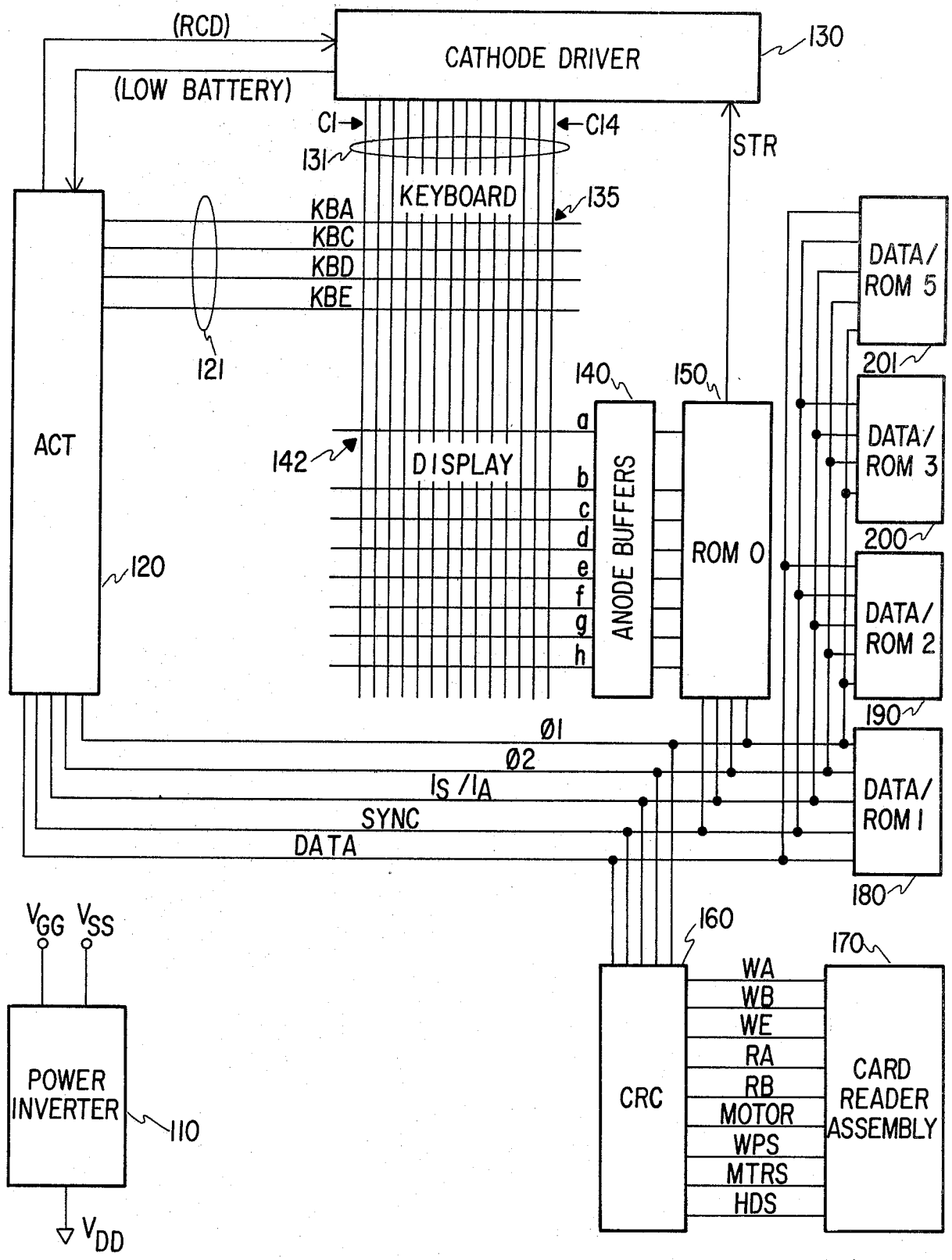
Figure 2:
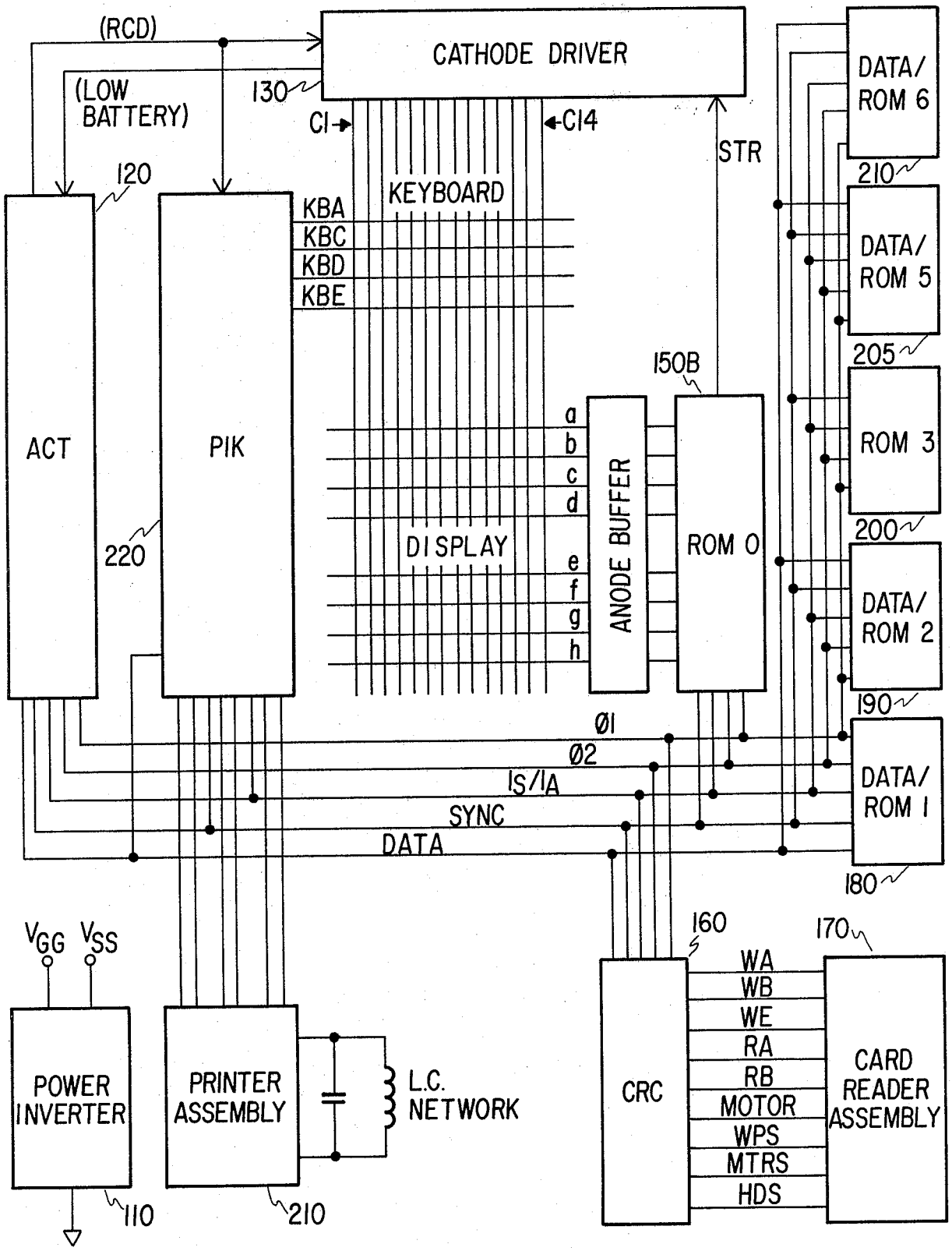
Figure 3:
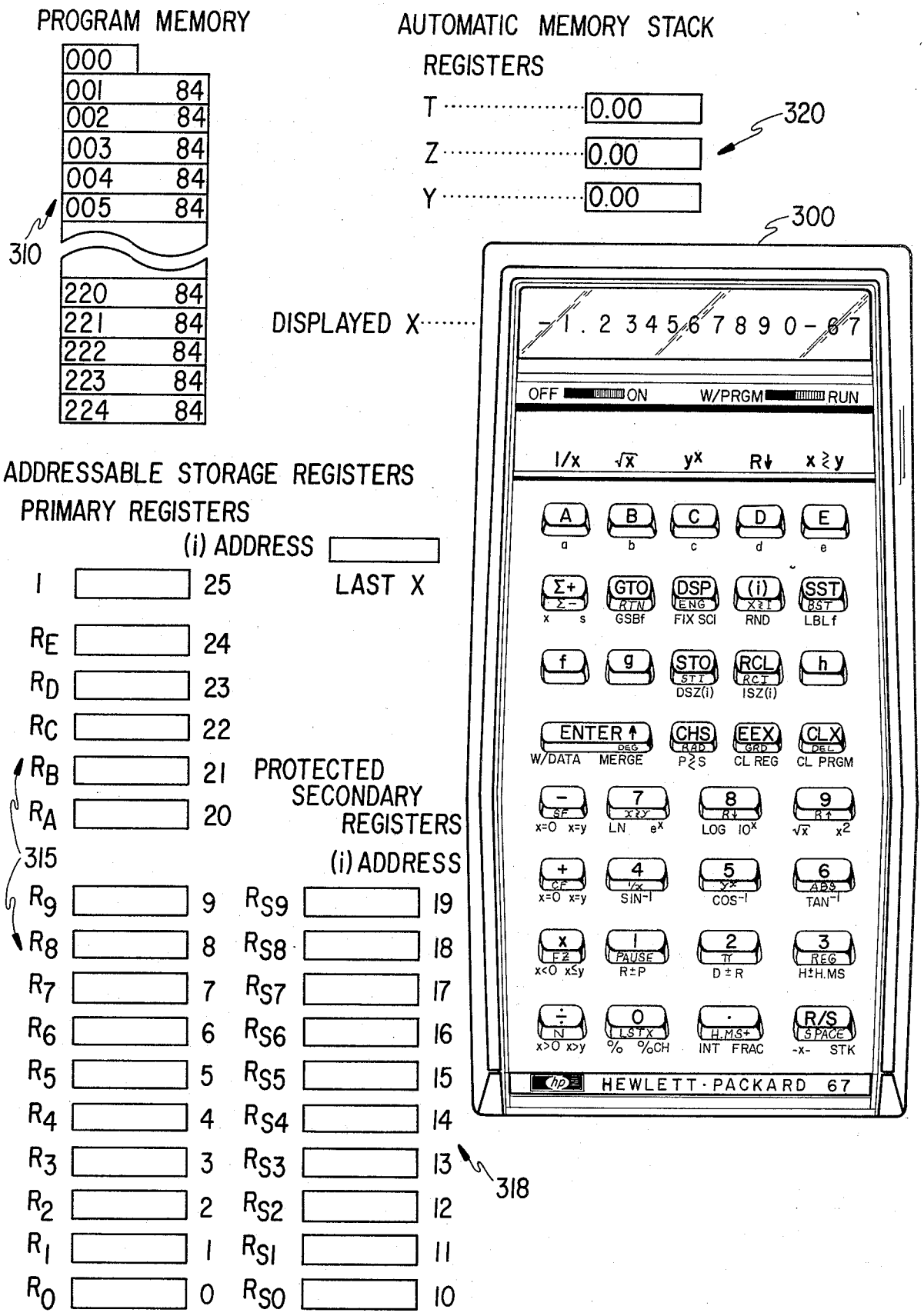
Figure 4:
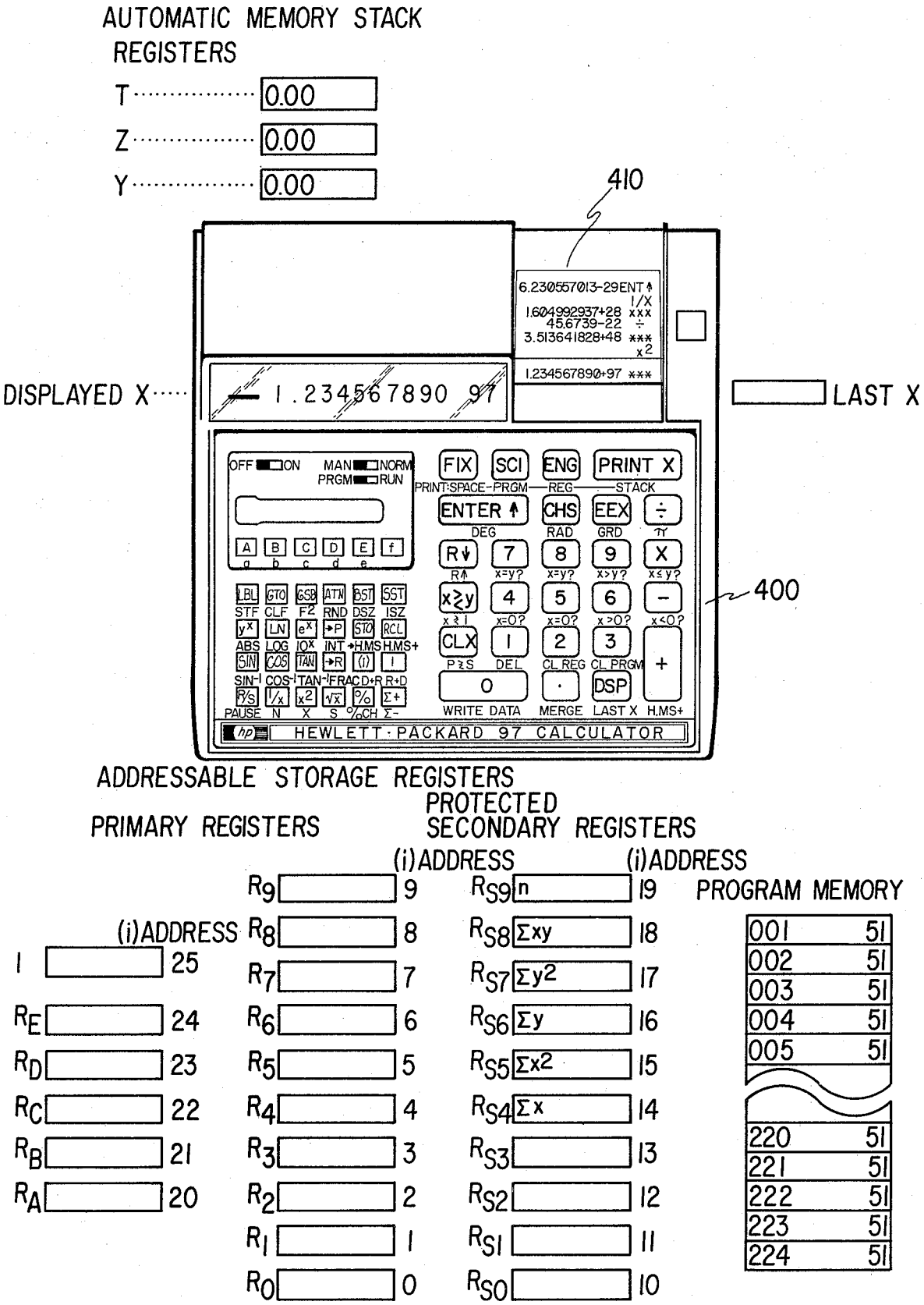
Figure 5:
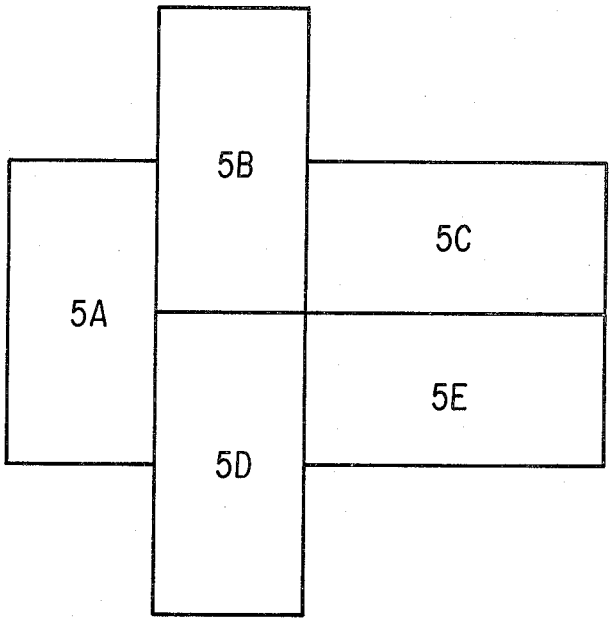
Figure 6:
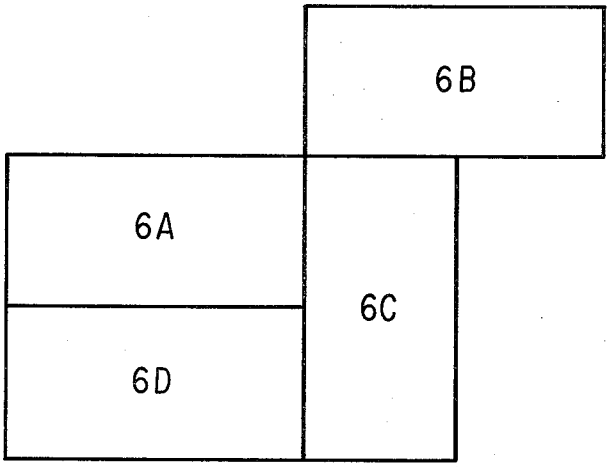
Figure 5A:
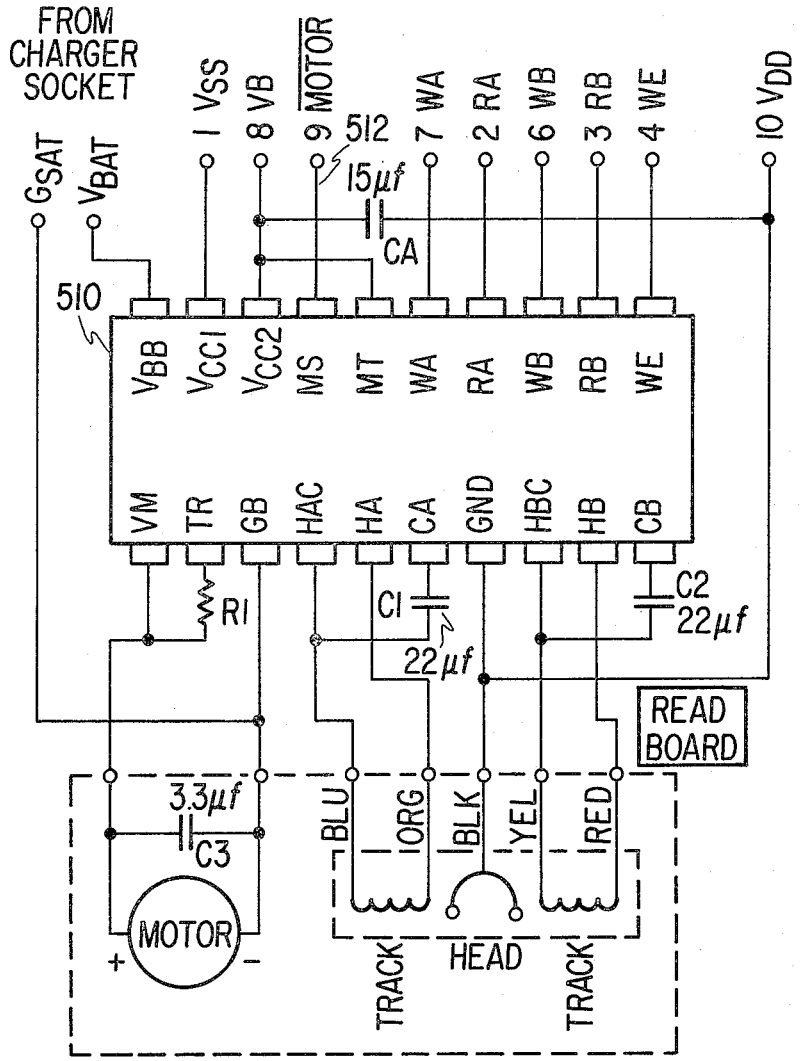
Figure 5B:
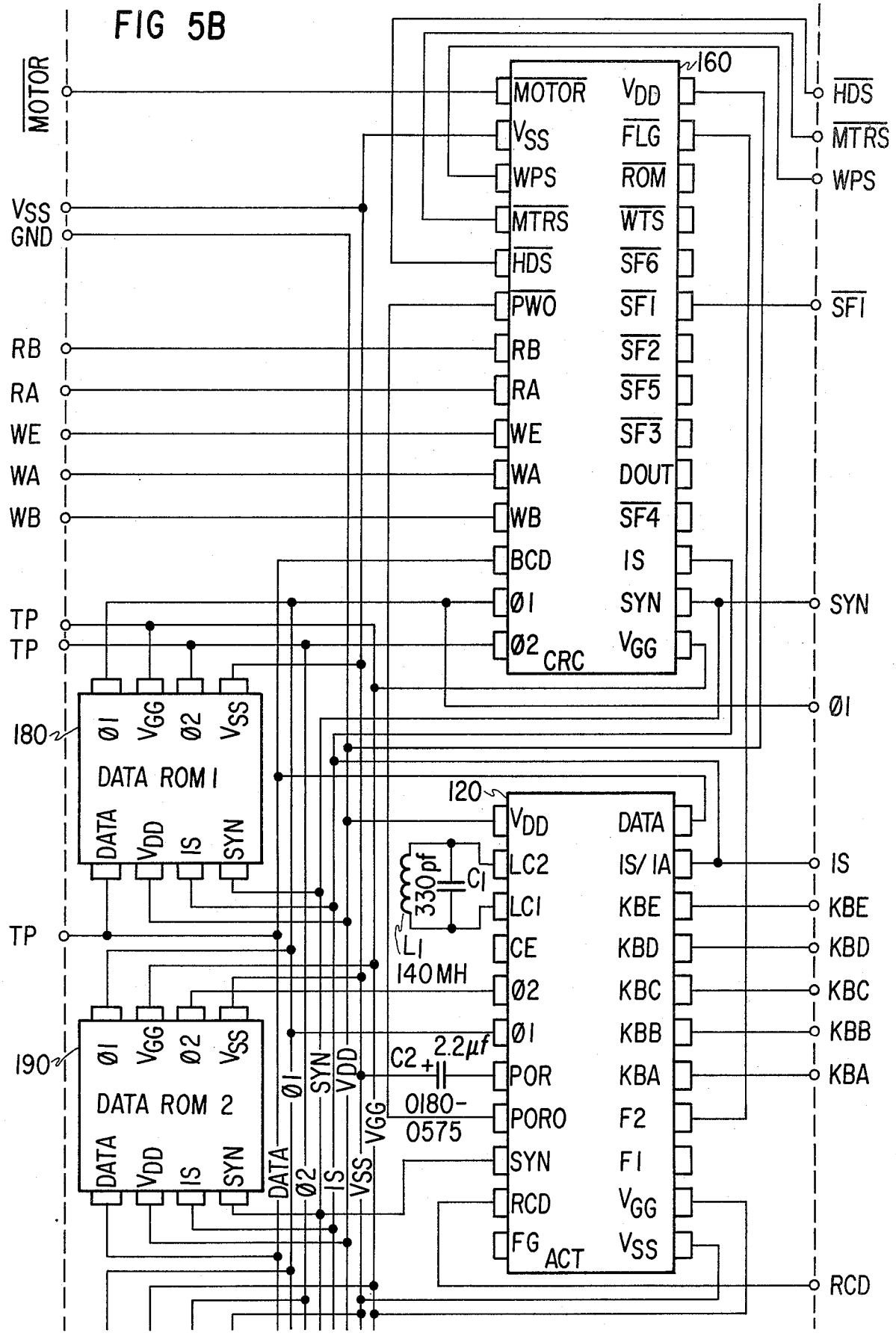
Figure 5C:
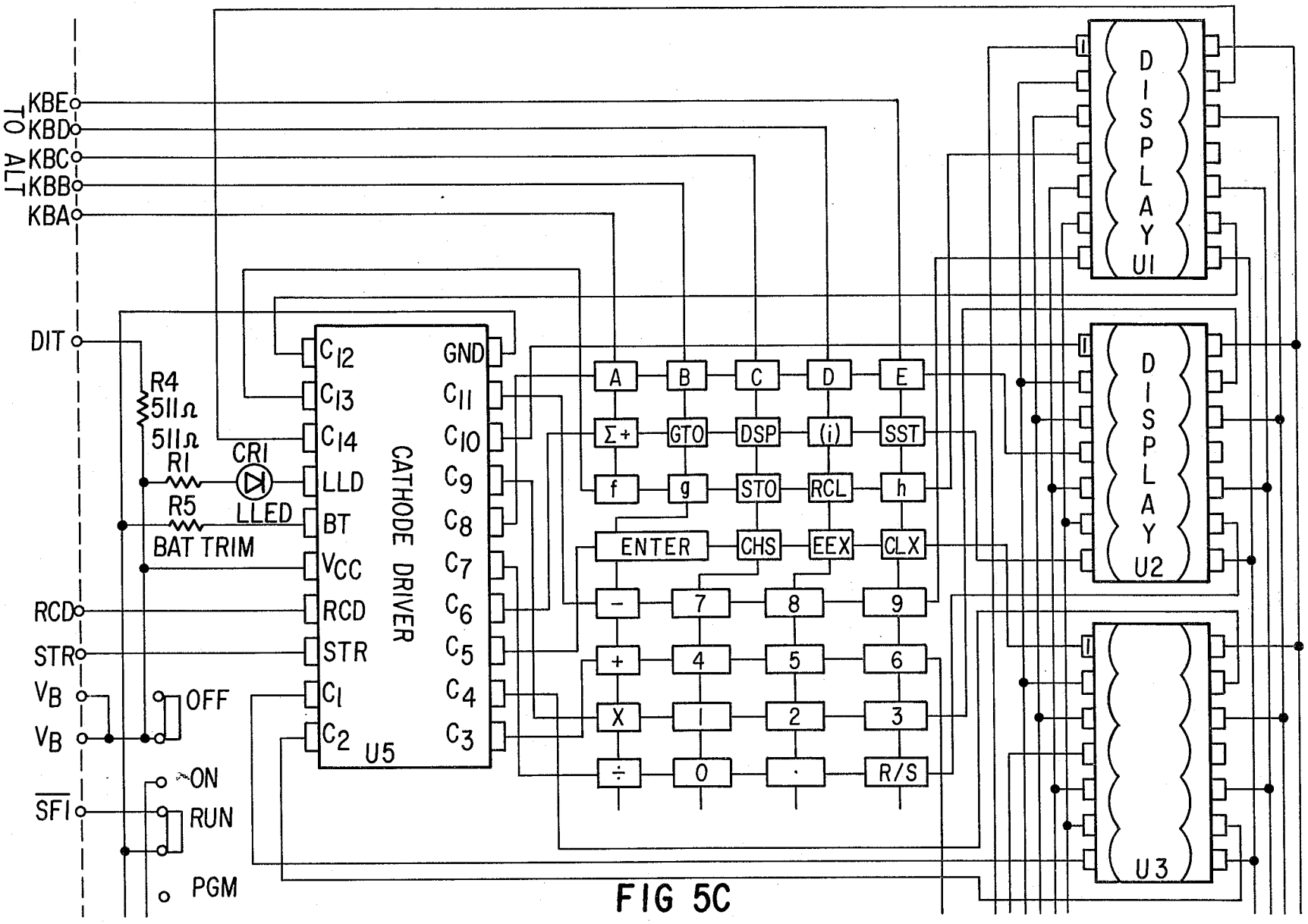
Figure 5D:
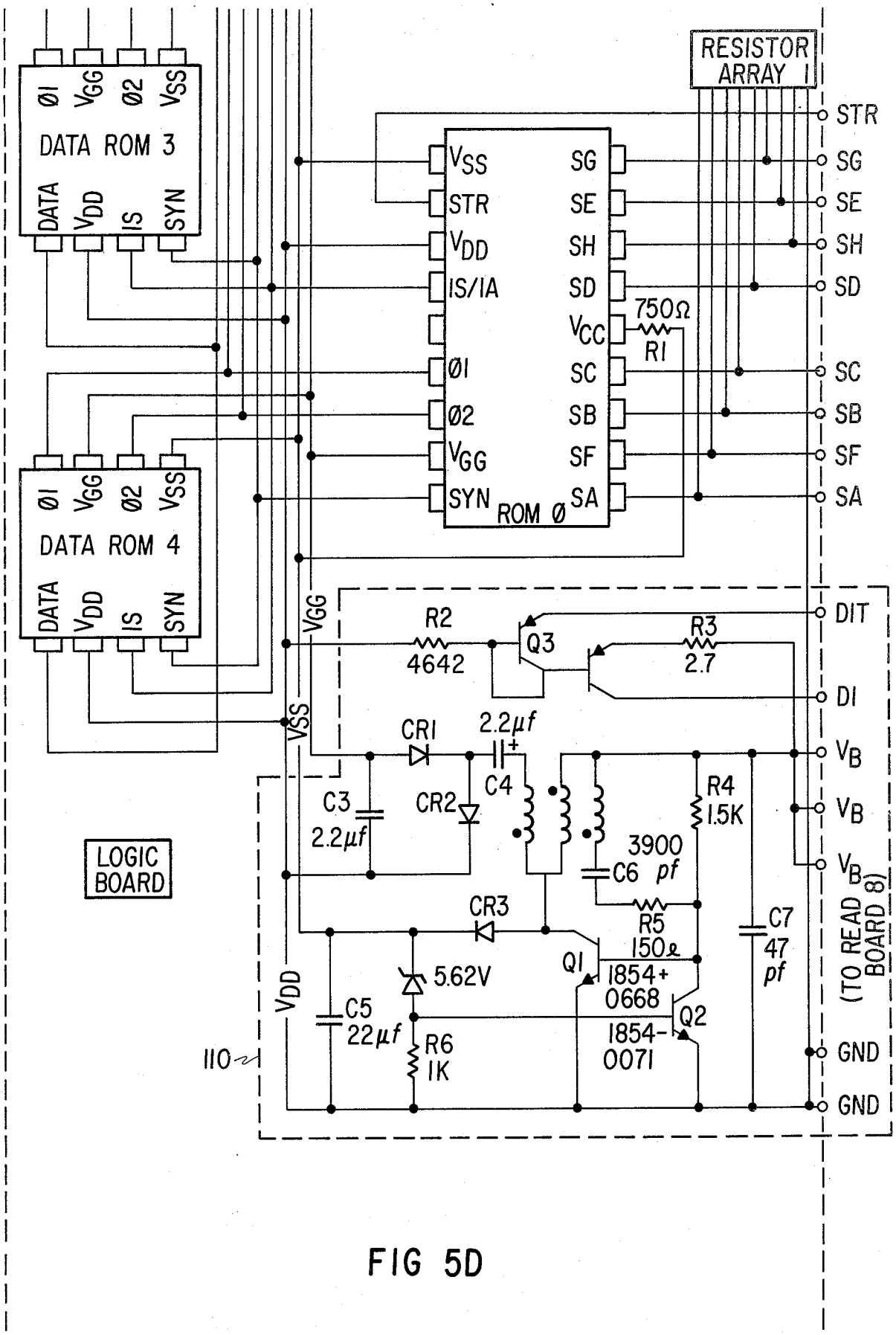
Figure 5E:
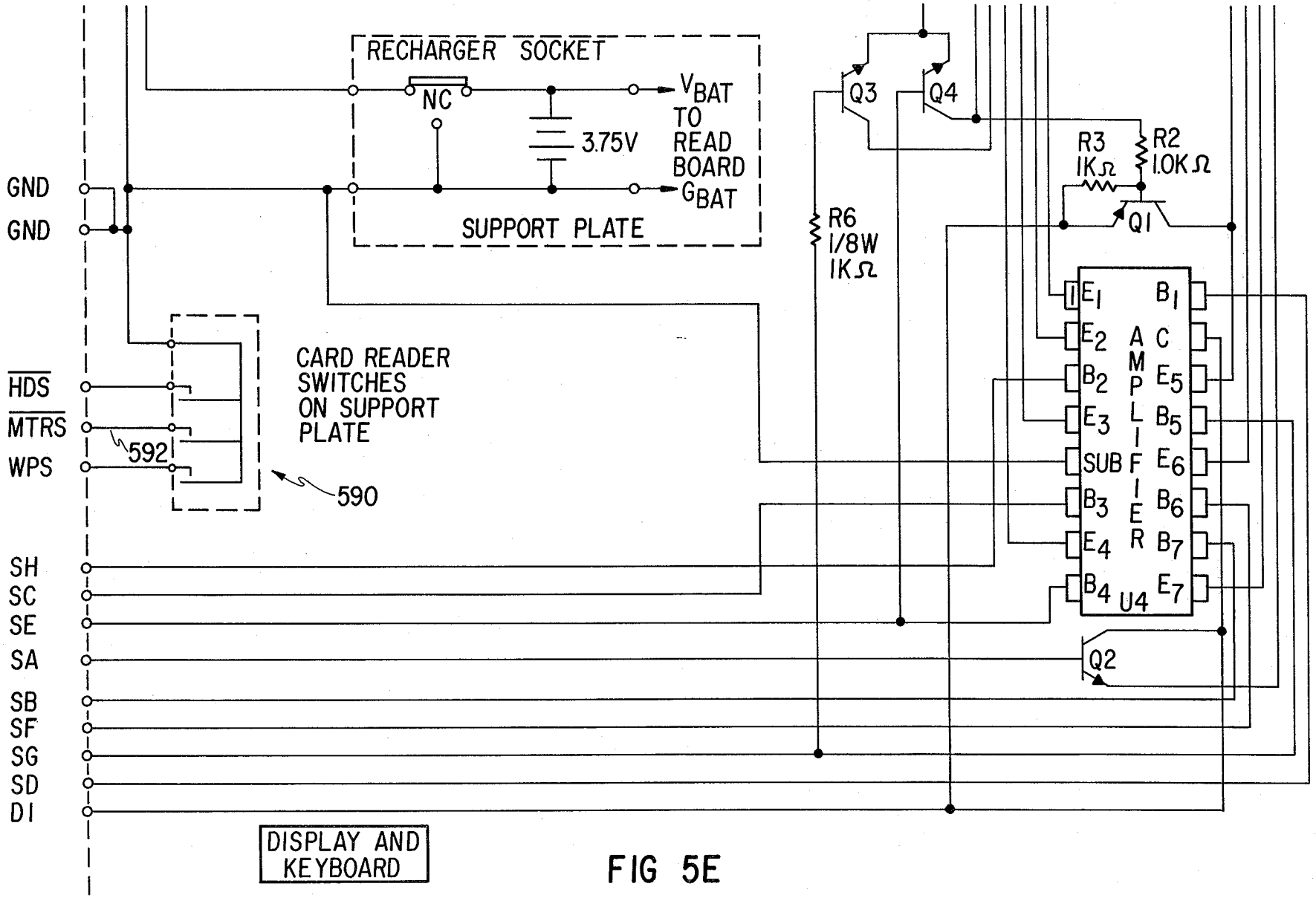
Figure 6A:
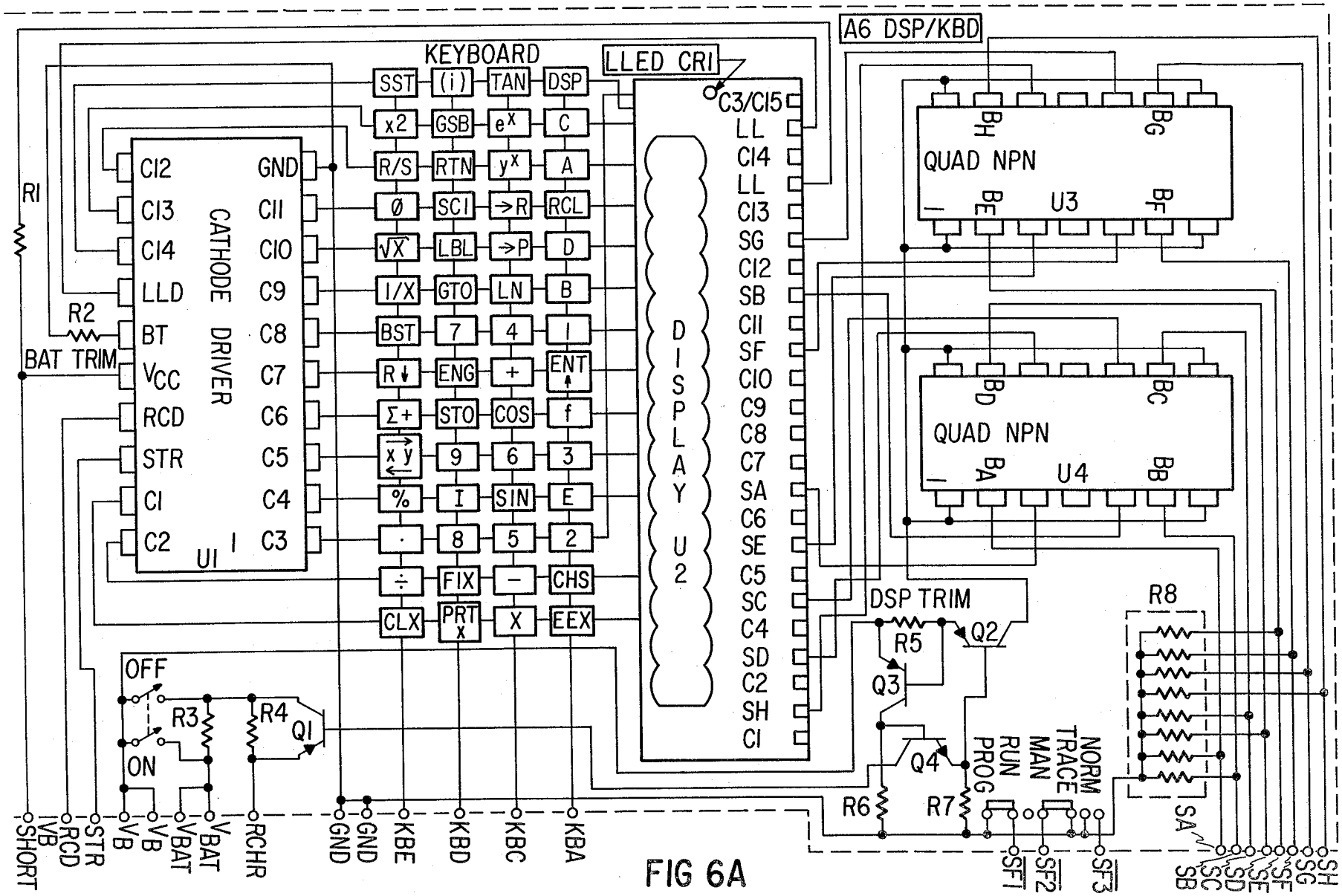
Figure 6B:
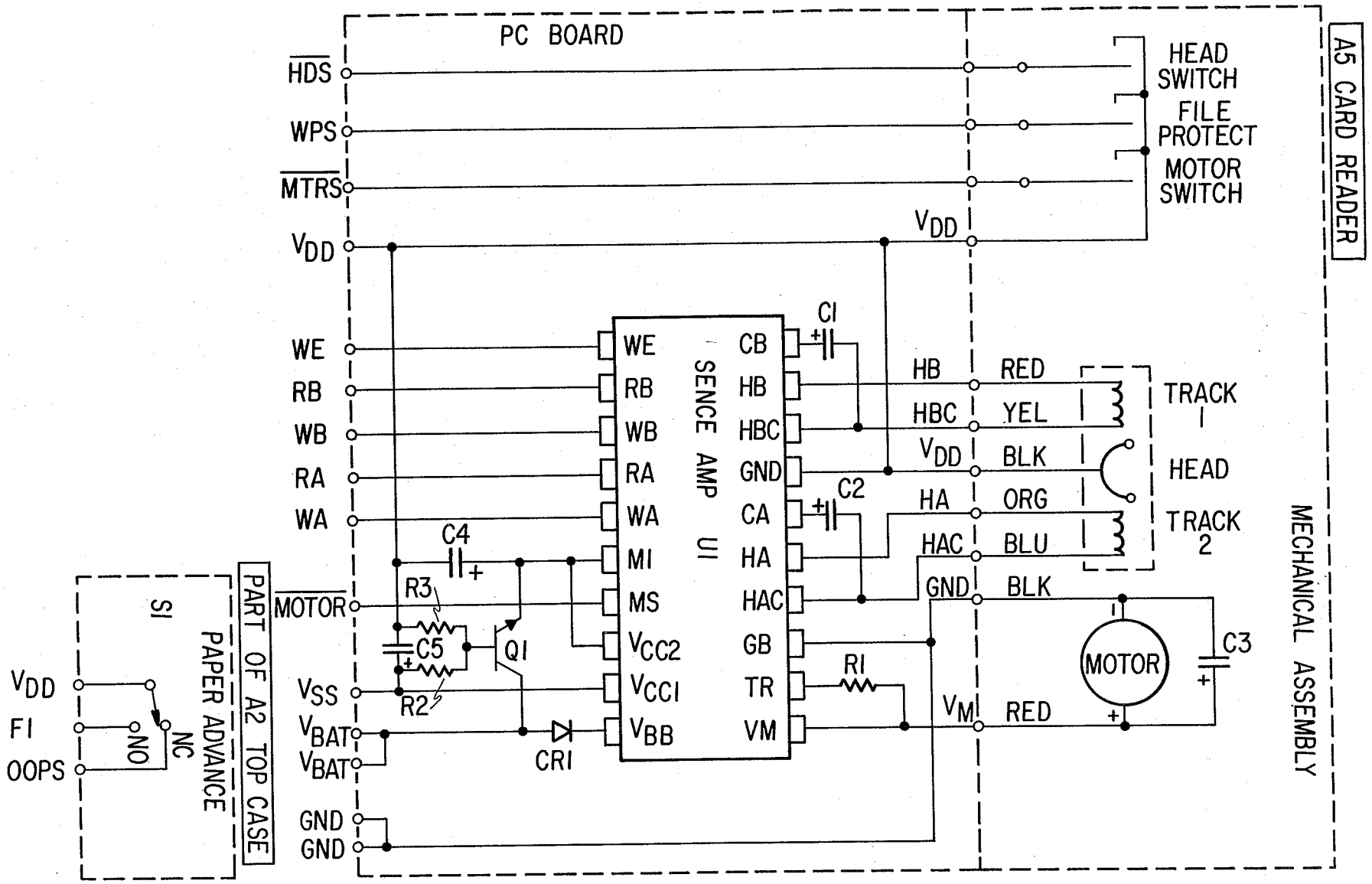
Figure 6C:
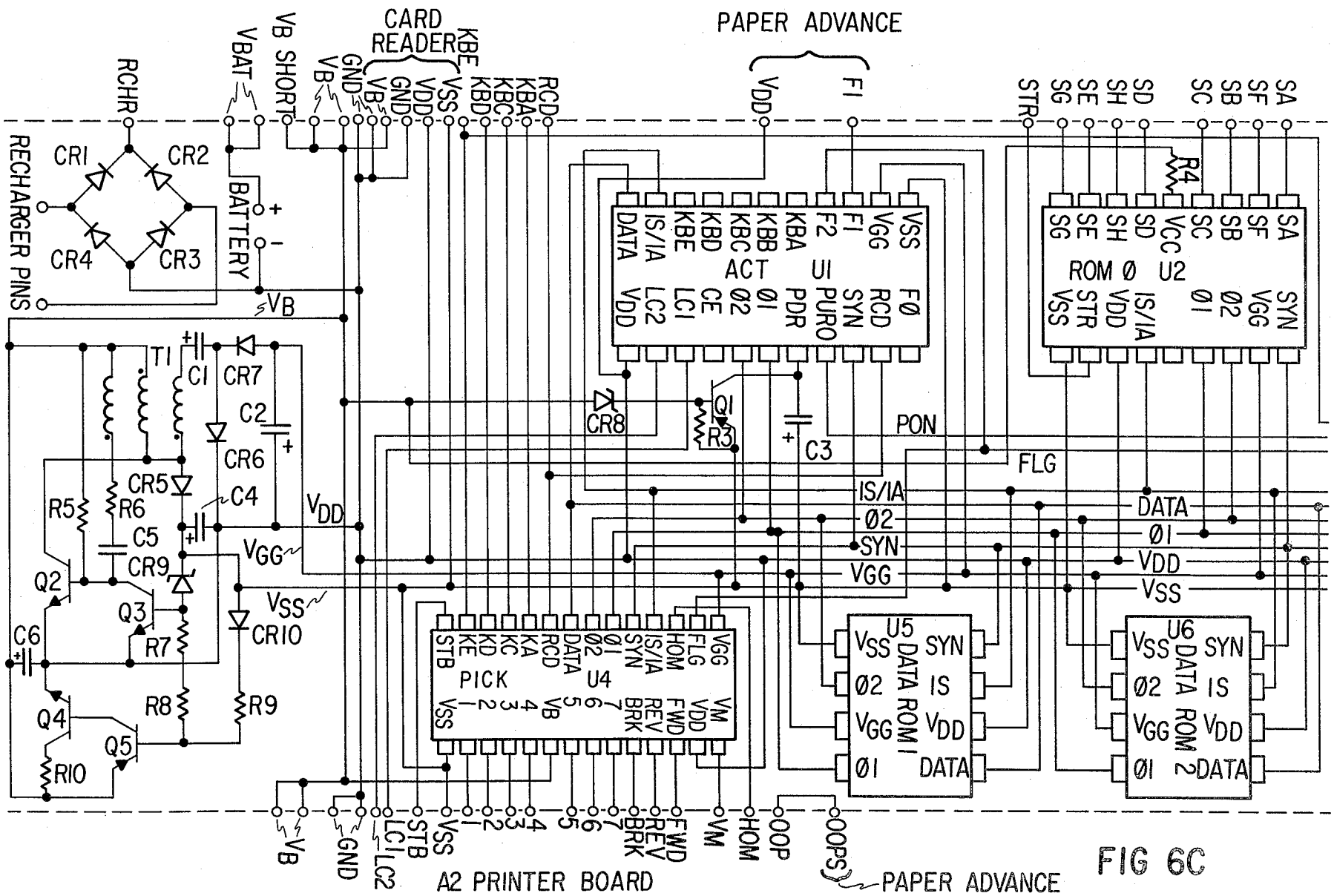
Figure 6D:
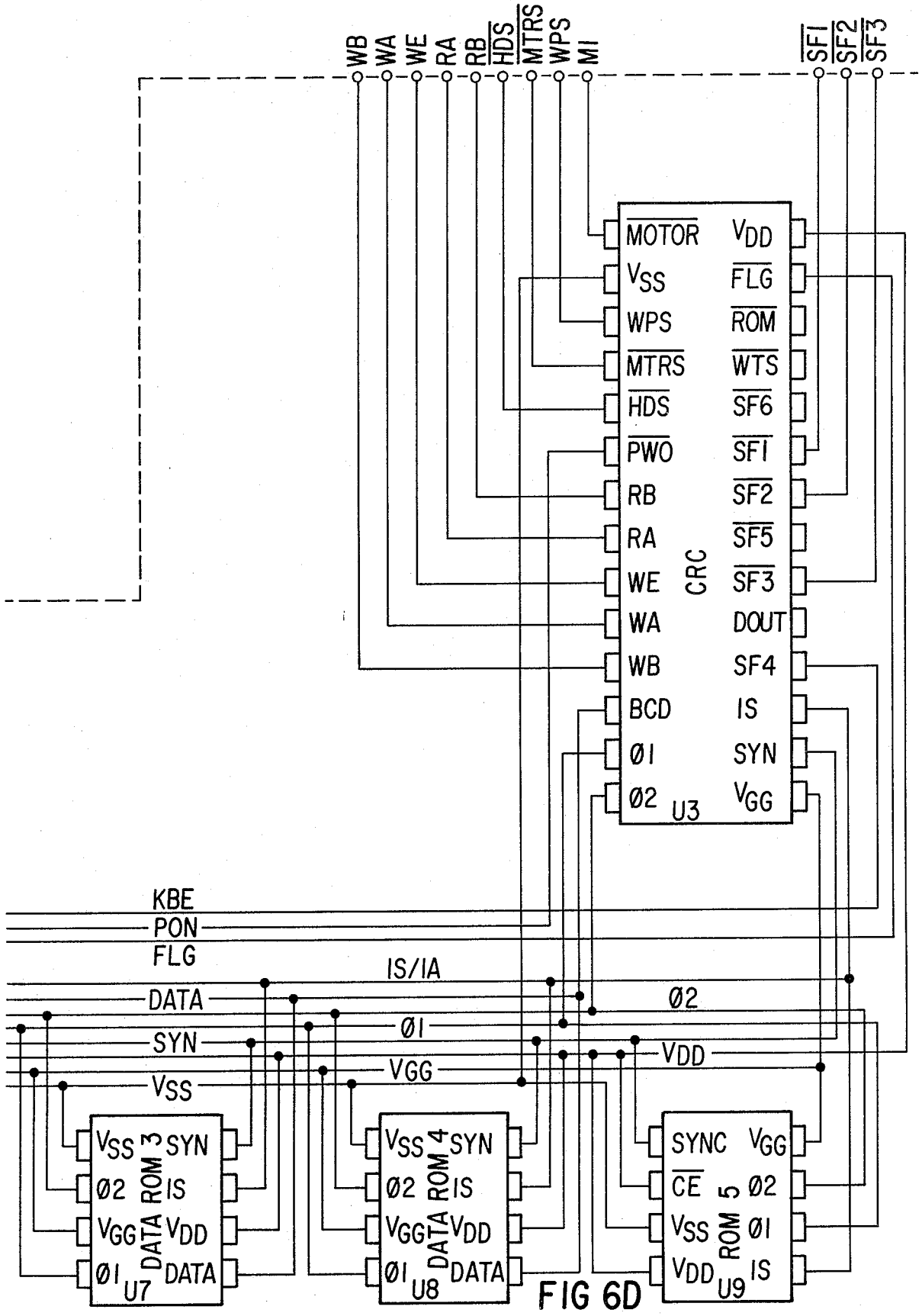
Figure 7:
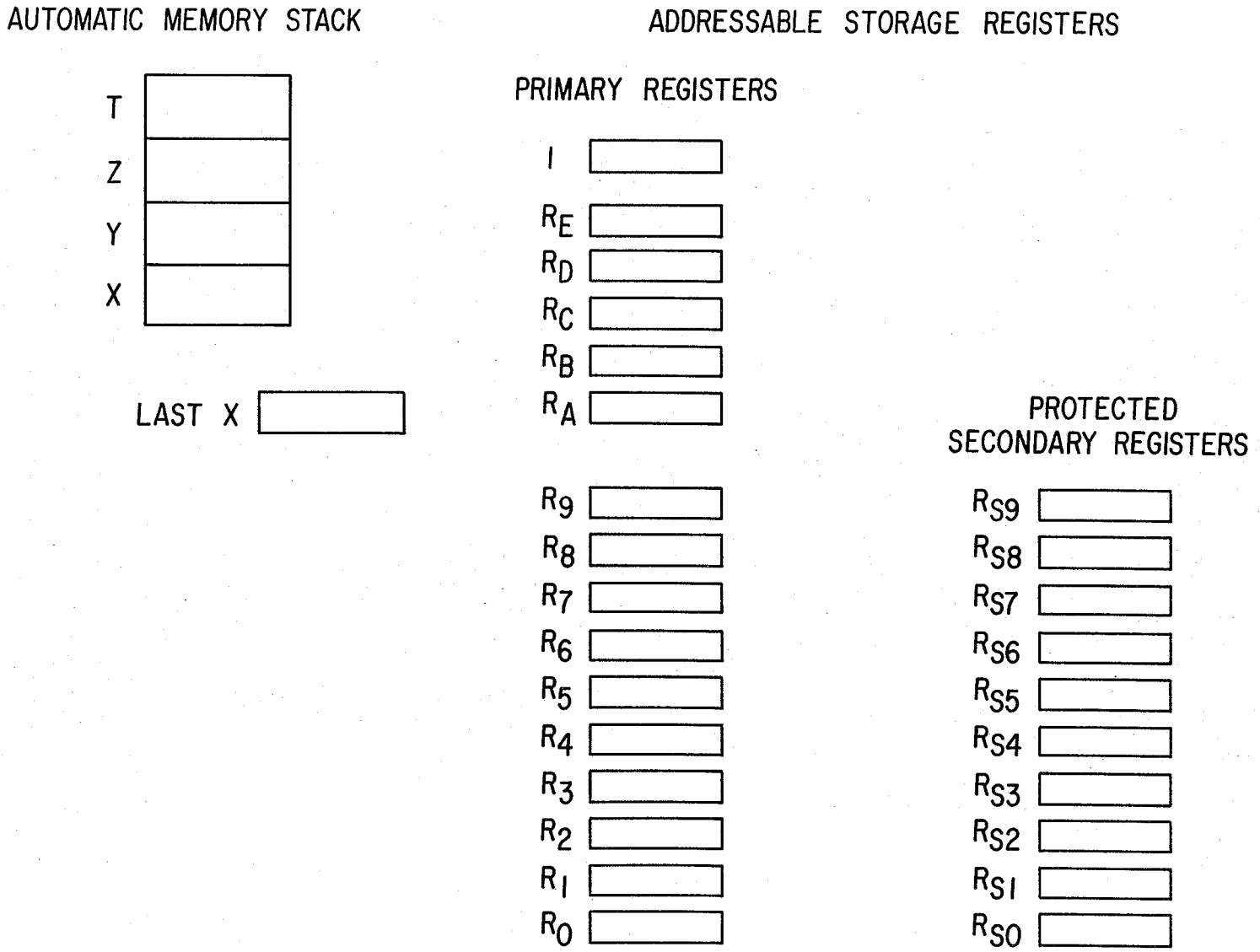
Figure 8:
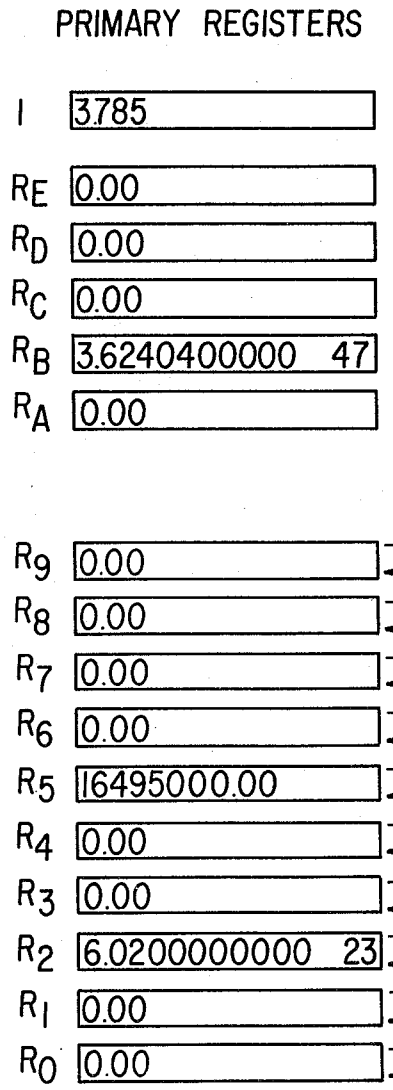
Figure 9:
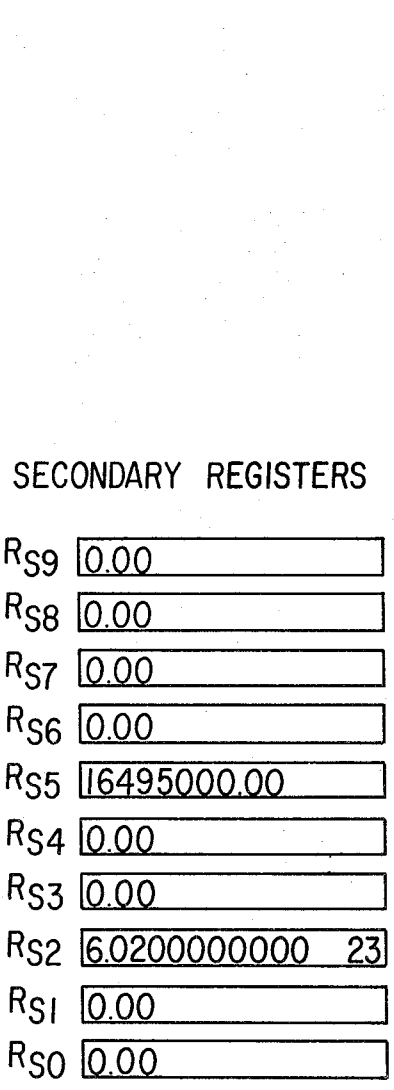
Figures 10, 11:
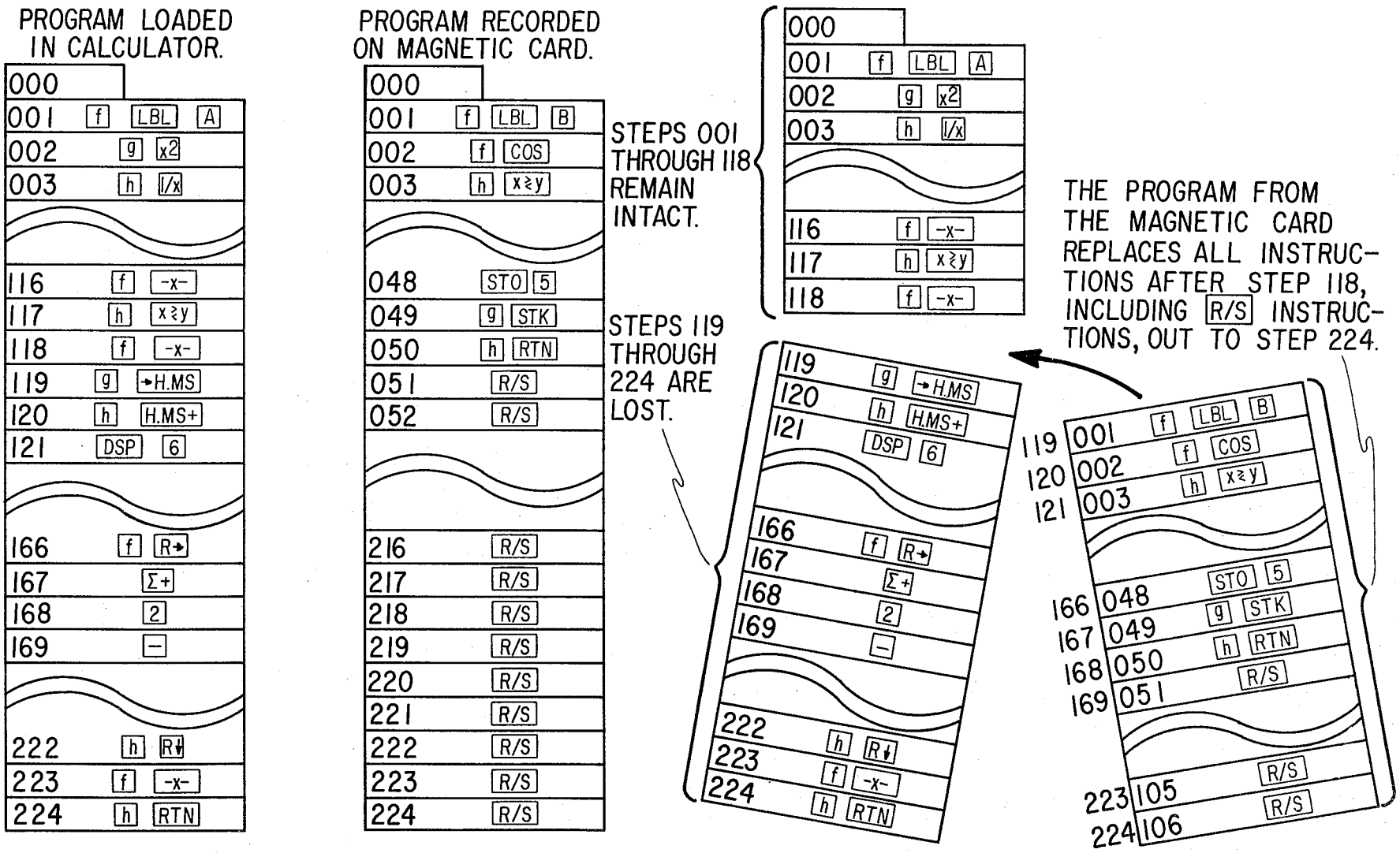
Figure 12:
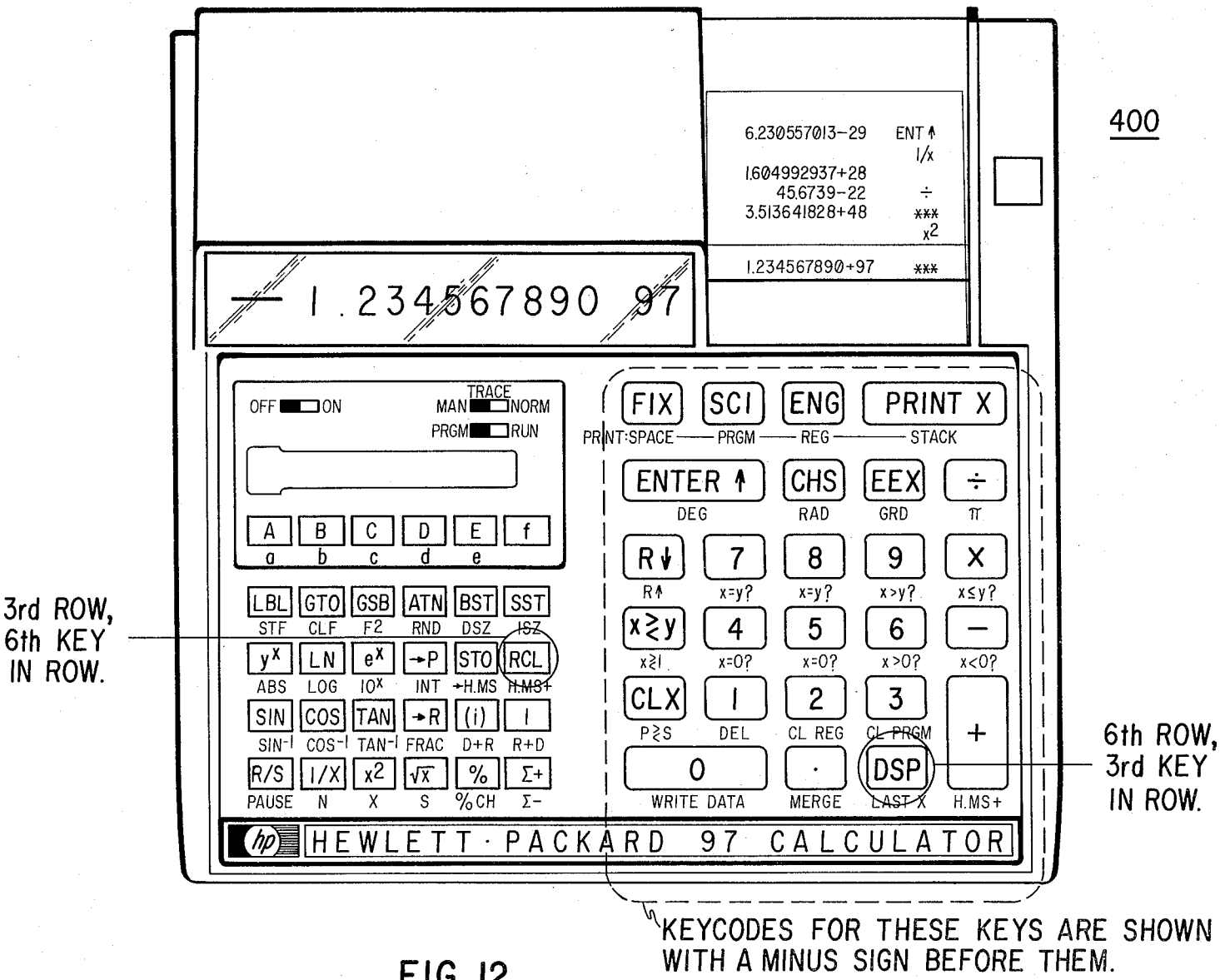
Figure 13:
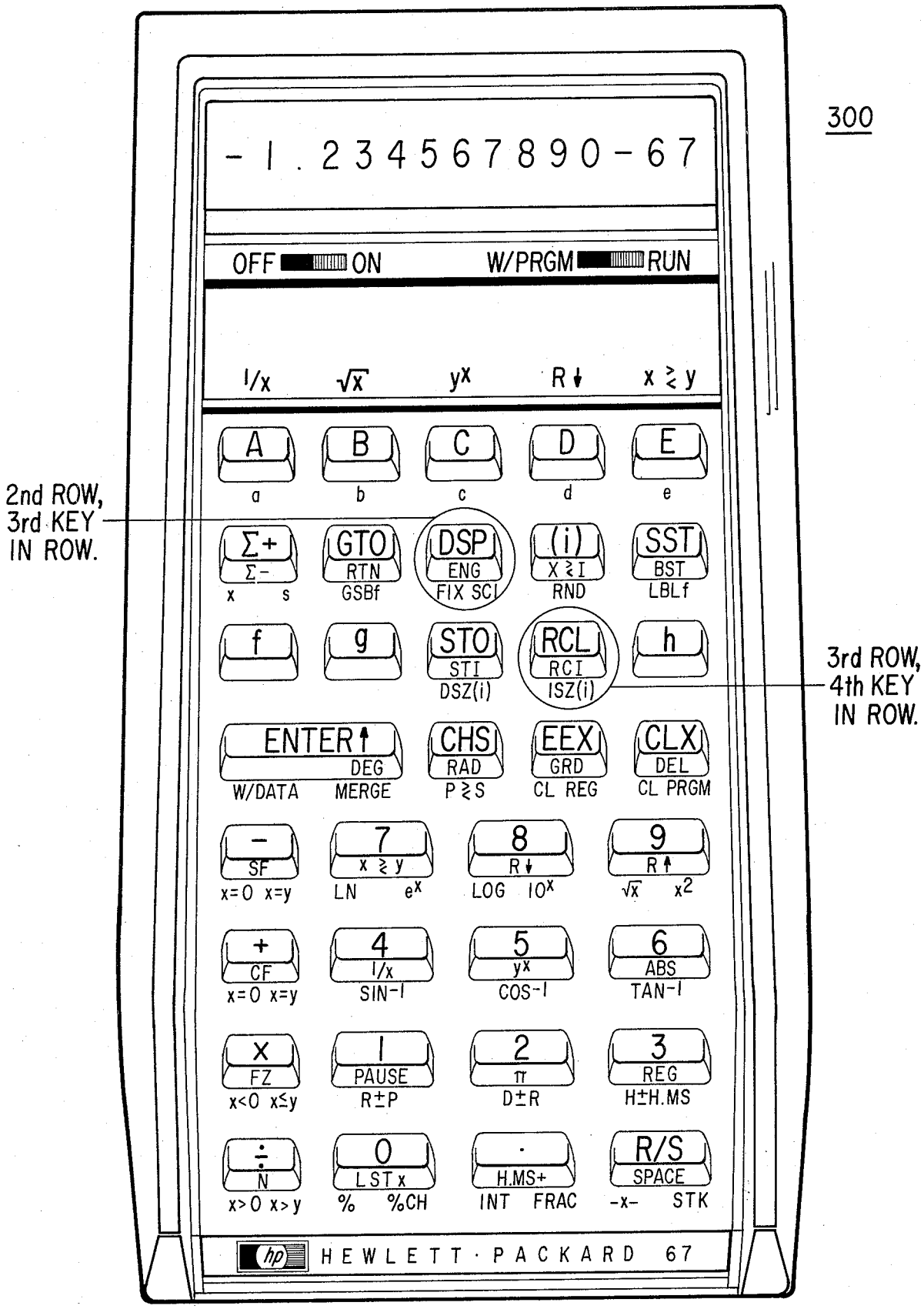

United States Defensive Publication [19] (H) [11] T101,701

Egbert [43] Apr. 6, 1982

[54] PORTABLE PROGRAMMABLE CALCULATOR

[76] Inventor: William E. Egbert, 1760 Noranda Dr., #1, Sunnyvale, Calif. 94087

[21] Appl. No.: 182,161

[22] Filed: Aug. 28, 1980

Related U.S. Application Data

[63] Continuation of Ser. No. 46,971, Jun. 8, 1979, abandoned, which is a continuation of Ser. No. 933,204, Aug. 14, 1978, abandoned, which is a continuation of Ser. No. 817,934, Jul. 22, 1977, abandoned, which is a continuation of Ser. No. 701,718, Jul. 1, 1976, abandoned.

[51] Int. Cl.[3] ..... G06F 15/02; G06F 15/04

[52] U.S. Cl. ..... 364/706; 364/709; 364/710

[57] ABSTRACT

Two battery-powered hand-held programmable calculators for performing arithmetic, trigonometric and logarithmic functions and displaying the results thereof are provided with the capability of being fully programmable via magnetic cards or a keyboard. Through a unique transmographic coding scheme, programs coded on one embodiment may be executed on a second embodiment even though the key codes for the respective functions are dissimilar. In one embodiment, a processor distinguishes between magnetic cards containing coded instructions and cards containing data. The calculator prompts the user via the display when additional cards are needed to form a complete set of program instructions. The processor, registers, and display may be initialized by control words on magnetic cards. During program execution, the calculator can pause to permit data entry from the keyboard or from magnetic cards. The operator may also cause the calculator to pause and display the data of an intermediate calculation. A number of stack and program review capabilities are provided, including the ability to accelerate, temporarily suspend, or indefinitely suspend review. The operator may select either of two sets of registers for access by the processor. In one embodiment, a hard copy printer is provided for creating a permanent record of the calculations.

6 Claims, 19 Sheets Drawing,

157 Pages Specification

The file of this unexamined application may be inspected and copies thereof may be purchased (849 O.G. 1221, Apr. 9, 1968).

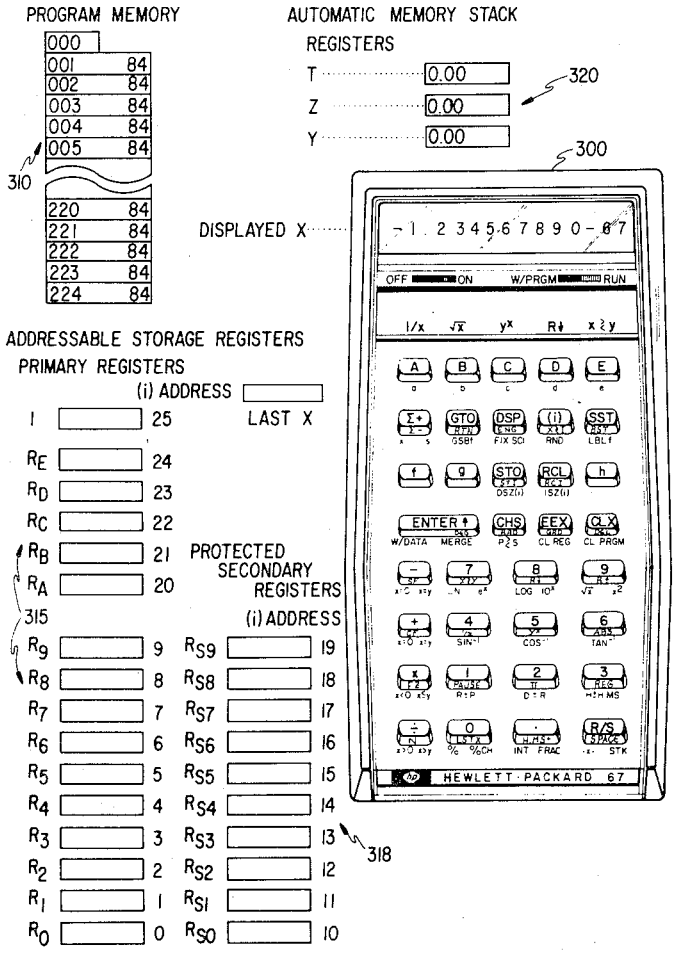

LOGIC/DISPLAY

| | | | |
|---|---|---|---|
| 1 | $V_B$ | 15 | WPS |
| 2 | $V_B$ | 16 | STR |
| 3 | SF1 | 17 | SF |
| 4 | Ø1 | 18 | SA |
| 5 | SYN | 19 | SB |
| 6 | IS | 20 | SC |
| 7 | KBA | 21 | SD |
| 8 | KBB | 22 | SG |
| 9 | KBC | 23 | SE |
| 10 | KBD | 24 | SM |
| 11 | KBE | 25 | DI |
| 12 | HDS | 26 | DIT |
| 13 | MTRS | 27 | GND |
| 14 | RCD | 28 | GND |

LOGIC/CARD READER

| | |
|---|---|
| 1 | $V_{SS}$ |
| 2 | $R_A$ |
| 3 | $R_B$ |
| 4 | $W_E$ |
| 5 | $D_{OUT}$ |
| 6 | $W_B$ |
| 7 | $W_E$ |
| 8 | $V_B$ |
| 9 | MOTOR |
| 10 | GND |

MOTOR
VSS
GND
RB
RA
WE
WA
WB
TP
TP
TP
180
Ø1
VGG
Ø2
VSS
DATA ROM 1
DATA
VDD
IS
SYN
190
DATA ROM 2
160
MOTOR
VSS
WPS
MTRS
HDS
PWO
RB
RA
WE
WA
WB
BCD
Ø1
Ø2
CRC
VDD
FLG
ROM
WTS
SF6
SF1
SF2
SF5
SF3
DOUT
SF4
IS
SYN
VGG
120
VDD
LC2
LC1
CE
Ø2
Ø1
POR
PORO
SYN
RCD
FG
ACT
DATA
IS/IA
KBE
KBD
KBC
KBB
KBA
F2
F1
VGG
VSS
330pf
C1
L1
140MH
C2
2.2μf
0180-0575
HDS
MTRS
WPS
SF1
SYN
Ø1
IS
KBE
KBD
KBC
KBB
KBA
RCD